US011983968B2

(12) United States Patent
Pretini et al.

(10) Patent No.: US 11,983,968 B2
(45) Date of Patent: May 14, 2024

(54) SMART TRENDER FOR INDUSTRIAL CONTROL SYSTEMS

(71) Applicant: NUOVO PIGNONE TECNOLOGIE SRL, Florence (IT)

(72) Inventors: Luca Pretini, Florence (IT); Gianni Bagni, Florence (IT); Antonio Baldassarre, Florence (IT)

(73) Assignee: Nuovo Pignone Tecnologie SRL, Florence (IT)

( * ) Notice: Subject to any disclaimer, the term of this patent is extended or adjusted under 35 U.S.C. 154(b) by 279 days.

(21) Appl. No.: 16/301,673

(22) PCT Filed: May 22, 2017

(86) PCT No.: PCT/EP2017/062226
§ 371 (c)(1),
(2) Date: Nov. 14, 2018

(87) PCT Pub. No.: WO2017/202752
PCT Pub. Date: Nov. 30, 2017

(65) Prior Publication Data
US 2019/0287315 A1 Sep. 19, 2019

(30) Foreign Application Priority Data
May 24, 2016 (IT) .................. 102016000053184

(51) Int. Cl.
*G07C 3/12* (2006.01)
*G06F 16/2452* (2019.01)
(Continued)

(52) U.S. Cl.
CPC ......... *G07C 3/12* (2013.01); *G06F 16/24522* (2019.01); *G06F 16/2477* (2019.01); *G07C 3/00* (2013.01)

(58) Field of Classification Search
CPC ......... G07C 3/12; G07C 3/00; G06F 16/2477; G06F 16/24522; G06F 16/00
See application file for complete search history.

(56) References Cited

U.S. PATENT DOCUMENTS 6,216,066 B1 * 4/2001 Goebel .............. G05B 23/0232
340/438
6,343,251 B1 * 1/2002 Herron ...................... F02C 9/00
701/100
(Continued)

FOREIGN PATENT DOCUMENTS

IN 3297/CHE/2015 A * 6/2015 .............. G06F 11/00

OTHER PUBLICATIONS

Cavarzere, Application of Forecasting Methodologies to Predict Gas Turbine Behavior Over Time, Oct. 2011, Journal of Engineering for Gas Turbines and Power, online, pp. 1-7 (Year: 2011).*

(Continued)

*Primary Examiner* — Etienne P Leroux
*Assistant Examiner* — J Mitchell Curran
(74) *Attorney, Agent, or Firm* — Paul Frank + Collins P.C.

(57) ABSTRACT

There are provided methods and devices for use with industrial control systems. For example, there is provided a method that can include acquiring data from a sensor associated with an industrial machine. The method can include determining, while acquiring the data, whether at least one condition is satisfied in the data. Furthermore, the method can include logging the data as a function of time and logging information associated with the at least one condition as a function of time, in response to the at least one condition being satisfied. The method can also querying the (Continued)

logged information, subsequent to logging the data, to identify subsets of the data for which the at least one condition is satisfied.

15 Claims, 6 Drawing Sheets

(51) Int. Cl.
*G06F 16/2458* (2019.01)
*G07C 3/00* (2006.01)

(56) References Cited

U.S. PATENT DOCUMENTS

| | | | | |
|---|---|---|---|---|
| 7,143,009 B2* | 11/2006 | Patanian | ............ | G05B 23/0213 |
| | | | | 702/182 |
| 2002/0077779 A1* | 6/2002 | Liebl | .................... | G01R 31/319 |
| | | | | 702/183 |
| 2010/0082267 A1* | 4/2010 | Schimert | ............ | G05B 19/4065 |
| | | | | 702/179 |
| 2010/0280673 A1* | 11/2010 | Woste | ................ | G05B 23/0235 |
| | | | | 700/287 |
| 2014/0075362 A1 | 3/2014 | Gray et al. | | |
| 2014/0163926 A1* | 6/2014 | Pedersen | .................... | F02C 9/00 |
| | | | | 702/183 |
| 2014/0271114 A1 | 9/2014 | Phillips et al. | | |
| 2015/0040650 A1 | 2/2015 | Lacaille | | |
| 2016/0140155 A1* | 5/2016 | Bothier | .............. | G05B 23/0283 |
| | | | | 707/812 |
| 2017/0293276 A1* | 10/2017 | Hubauer | ............ | G06F 16/24522 |

OTHER PUBLICATIONS

PCT Search Report and Written Opinion issued in connection with corresponding Application No. PCT/EP2017/062226 dated Aug. 1, 2017.

* cited by examiner

SMART TRENDER FOR INDUSTRIAL CONTROL SYSTEMS

TECHNICAL FIELD

The present disclosure relates to industrial control systems. More particularly, the present disclosure relates to smart trenders for industrial control systems.

BACKGROUND

In many industrial control applications, measured data from industrial machines are logged as a function of time to provide trend information. For example, the speed of a gas turbine may be logged all year round according to a predetermined time index. Specifically, the average speed of the gas turbine during each hour of operation may be logged to provide a detailed account of the turbine's average speed over several hours, days, or even months. Thus, industrial plant managers and operators are presented with a plethora of data that are difficult to analyze. This impedes timely and informed decision making, as trend information can only be obtained by going through the entire time series data to identify specific events of interest.

SUMMARY

Given the aforementioned deficiencies, a need exists for improved control methods and hardware capable of providing trend information associated with measured data from industrial machines in order to provide advanced analysis capabilities, easy performance forecasting and decision making.

The embodiments featured herein help solve the above-noted issues. For example, embodiments of the present invention allow a user to access data by searching for a specific event and/or a predetermined equipment status. The user can get answers easily and in real time or analysis of measured data from industrial machines can occur without human interaction.

For example, in one embodiment, there is provided a method for use by a system coupled to at least one of a gas turbine and a combustor. The method can include acquiring data from a sensor associated with at least one of the gas turbine and the combustor. Further, the method can include determining, while acquiring the data, whether at least one condition is satisfied in the data. Furthermore, the method can include logging the data as a function of time and logging information associated with the at least one condition as a function of time, in response to the at least one condition being satisfied. The method can also include querying the logged information, subsequent to logging the data, to identify subsets of the data for which the at least one condition is satisfied.

In another exemplary embodiment, there is provided a non-transitory computer-readable medium for use with a system coupled to at least one of a gas turbine and a combustor. The non-transitory computer-readable medium can include instructions that, when executed by a processor, cause the processor to perform certain operations that can include acquiring data from a sensor associated with at least one of the gas turbine and the combustor. The operations can further include logging the data as a function of time. The operations can include parsing the logged data to identify data subsets for which at least one condition is satisfied, based on a rule set, and subsequent to logging the data. The operations can further include generating a database including time information associated with the logged data for which rules of the rule set are satisfied.

In yet another exemplary embodiment, there is provided a controller for use with a system coupled to at least one of a gas turbine and a combustor. The controller can include a memory and a processor. The memory can include instructions that, when executed by the processor, cause the processor to perform certain operations. The operations can include receiving data from a sensor associated with at least one of the gas turbine and the combustor. The operations can further include determining whether at least one condition is satisfied in the data and logging the data as a function of time.

Furthermore, the operations can include logging information associated with the at least one condition as a function of time in response to the at least one condition being satisfied. The operations can also include parsing the logged information, subsequent to logging the data, to identify subsets of the data for which the at least one condition is satisfied.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

Figure 1:
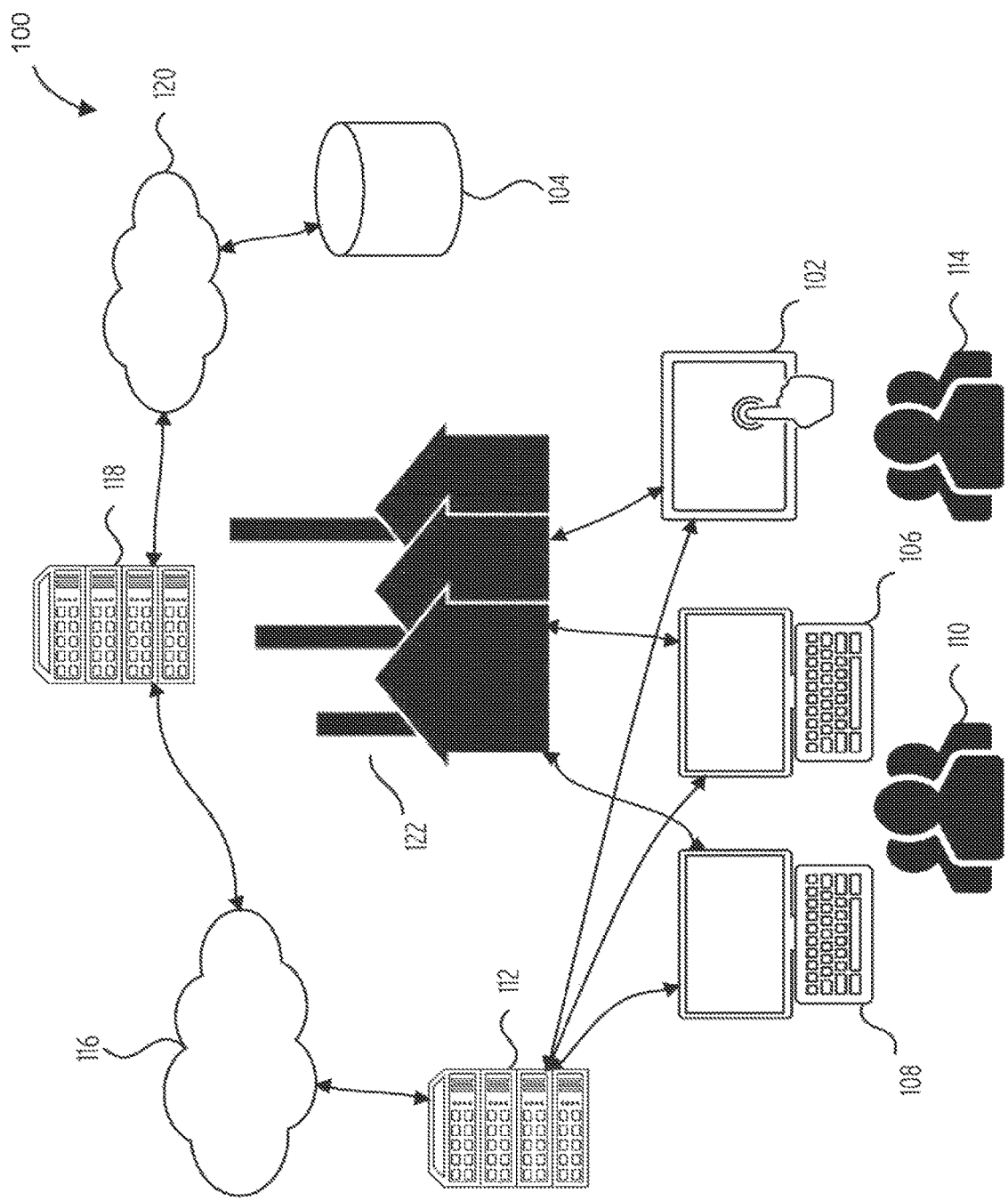
FIG. 1 is an illustration of a system, according to an embodiment.

FIG. 1 is an illustration of a system 100 in which the teachings of the present disclosure can be practiced. System 100 can include a plurality of devices, processors, controllers, sensors, and machines, all of which cooperatively function according to exemplary methods that will be described further below.

System 100 can include a plurality of control devices, such as computer 108, computer 106, and computing device 102. Computing device 102 can be either a mobile device or an embedded computer system that is included in an industrial machine. Computers 102 and 106 may be workstations. In other embodiments, computer 108, computer 106, and computing device 102 may all be part of an industrial control system, such as a distributed control system (DCS), designed to monitor and control the plurality of machines operating at industrial plant 122.

Computer 108, computer 106, and/or computing device 102 are operated by technicians 110 and 114 to control and monitor machines, equipment, and/or a variety of computer systems located at industrial plant 122. For example, industrial plant 122 can be an oil/gas power plant that houses a plurality of turbine trains. Generally speaking, industrial plant 122 can include a plurality of industrial machines like gas turbines, combustors, motors, and/or compressors, for example.

Controlling a device of industrial plant 122 can be achieved using specialized control software and/or hardware that can direct the device to perform one or more functions. The functions can be performed either sequentially or in parallel, and they may be scheduled for execution or performed as soon as they are requested by one of technicians 110 or one of technicians 114, or by a control program designed to automate the control of the device.

Moreover, any one of computing device 102, computer 106, and computer 108 can be used to monitor and/or log data reported by one or more sensors included in a particular industrial machine located at industrial plant 122. For example, the speed of a turbine may be logged and indexed as a function of time.

In another example, the acceleration of a turbine may be logged and indexed as a function of time. In yet other examples, the fuel consumption, the power output, the emission profile, and the pressure for each stage of the turbine can each be logged and indexed as a function of time. In general, any machine is contemplated in the context of the present disclosure, and any measurable variable, in addition to the ones mentioned above, is also contemplated.

System 100 can include a server 112 in which the above-mentioned time-based data can be stored or aggregated. Specifically, these data may be organized in a memory device associated with server 112 according to the type of data that is being stored and according to which machine the data are associated with it.

For example, the data may be stored in a file system where they are grouped by folders corresponding to speed, fuel consumption, etc. Each machine may have its own folder, under which subfolders corresponding to specific data types (e.g. fuel consumption, speed, etc.) are located. As one of ordinary skill in the art will readily recognize, the data organization described is not limiting, and it is only given here for illustrative purposes. In another embodiment, the data may be stored in a single file, called a "trend," that includes a collection of selected measurements kept together and aligned against time, i.e. along an x-axis representing time indices. Generally speaking, the number of files can be just be one (i.e. an XML file or a JSON file), two, or more than two.

System 100 can further include a server 118 communicatively coupled to server 112 via a network 116 and communicatively coupled to a database 104 via network 120. Server 118 can serve as a data center that aggregates information about a plurality of industrial plants like industrial plant 112. The information can be located in database 104 and can include the time-based data described above. It can also include information regarding a particular plant and/or machines associated with the particular plant.

Furthermore, server 118 can provide additional functionality to control devices located at industrial plant 122 or any other industrial plant it is associated with. For example, server 118 can provide software or firmware updates that include new or improved functions for the smart trender controllers described herein.

The new or improved functions can be downloaded from server 118 in the form of an application package, for example. These new or improved functions can be acquired by a user at industrial plant 122 or they can be automatically provided to the user's control device as part of a scheduled update.

The application package can be installed at a server 112, which may be co-located with computer 108, computer 106, computing device 102, and industrial plant 122. Alternatively, server 112 can be located at a remote location, while still being accessible to computer 108, computer 106, and computing device 102 via a network (not shown).

Figure 2:
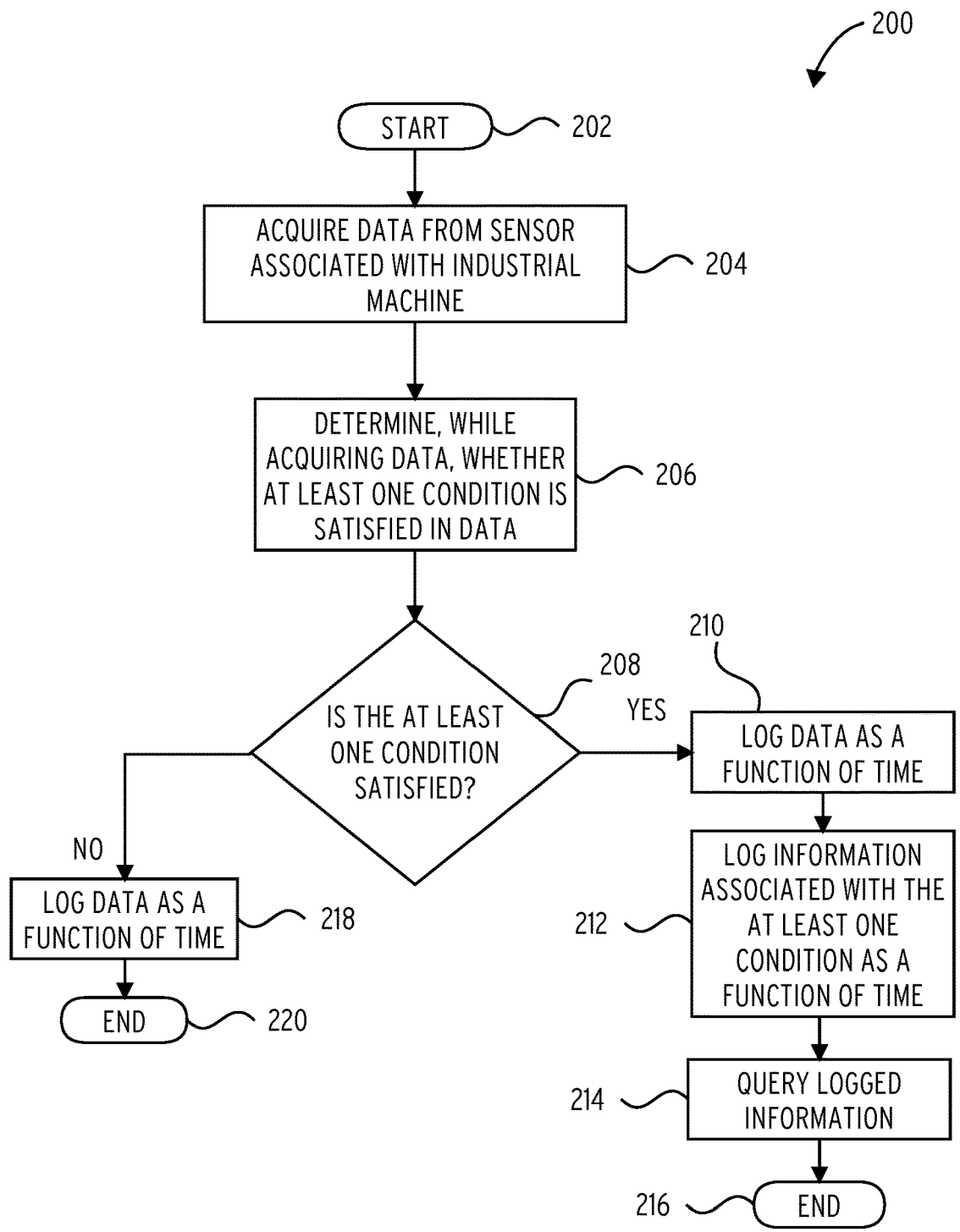
FIG. 2 depicts a flow chart of a method, according to an embodiment.

FIG. 2 depicts a flow chart of a method 200, according to an exemplary embodiment. Method 200 begins at block 202 and includes acquiring data from one or more sensors associated with one or more industrial machines (block 204).

For example, the sensors may be pressure sensors, fuel consumption sensors, NOx and/or CO2 emission sensors, power output sensors, speed transducers, etc. Further, as stated above, a wide variety of industrial machines are contemplated, without departing from the scope of this disclosure.

A controller executing method 200 can be programmed to determine, while the data is being acquired, whether specific conditions occur in the measured data (block 206). For example, this can include determining whether a turbine's instantaneous speed or average speed has fallen below a predetermined threshold. It can also include determining whether it is in a given range, or whether it has exceeded a predetermined threshold. Another condition may be, for example, the rate of change of a variable exceeding a predetermined threshold or being within a range. Without departing from the scope of the disclosure, any measurable attribute of a sensor signal (e.g. amplitude, phase, slope, etc.) can serve as a basis to check for a condition of interest in the measured signal.

Method 200 can further include checking whether one or more conditions are met, depending on a specified query, which may be a database access command (decision block 208). For example, a specified query can include checking two conditions, or in some cases, it can include checking just one condition. If the at least one condition is not satisfied, method 200 includes logging the acquired data as a function of time by generating and saving one or more measurement data files (block 218). Method 200 can then end at block 220. Otherwise, method 200 includes logging the data as a function time (block 210) and subsequently logging information associated with the at least one condition as a function of time by generating and saving one or more information files. Further, in yet other embodiments, the specified query can include multiple queries that are concatenated to form a single database access command configured to fetch and/or discriminate a variety of conditions from the data.

When method 200 finds that the condition is satisfied, markers identifying the specific condition that is met as well as the time index of the logged data at which it is met can be saved in an information file (block 212). For example, if the rate of change of speed is found to exceed a threshold, the times at which this occurs are saved. One or more files including the information can be generated, independently of (or together with) the measured and logged data. As such, in the future, information can simply be queried from a database including the information file(s) to identify times or time slices when specific conditions are met (block 214). Method 200 ends at block 216. Data files or information files can be generated according to existing or future file system and/or operating system file generation techniques.

Further, while the conditions in the exemplary embodiment described above have been described as being supplied to a controller in the form of a query, one of ordinary skill in the art will readily recognize that other means of checking for specific events can also be used. For example, a controller executing method 200 can be supplied a set of rules against which the data is checked as it is being acquired. The rules can embody any condition that a user wishes to check.

Furthermore, once information has been logged with respect to time indices at which the conditions are met, additional queries can be performed or rules can be applied on the logged data to determine when they satisfy additional conditions. For example, a first query on the logged information can include determining the time slices for which the logged data meet a first condition. A second query can include determining at which times or time periods subsets of the data corresponding to these time slices satisfy a second condition.

Figure 3:
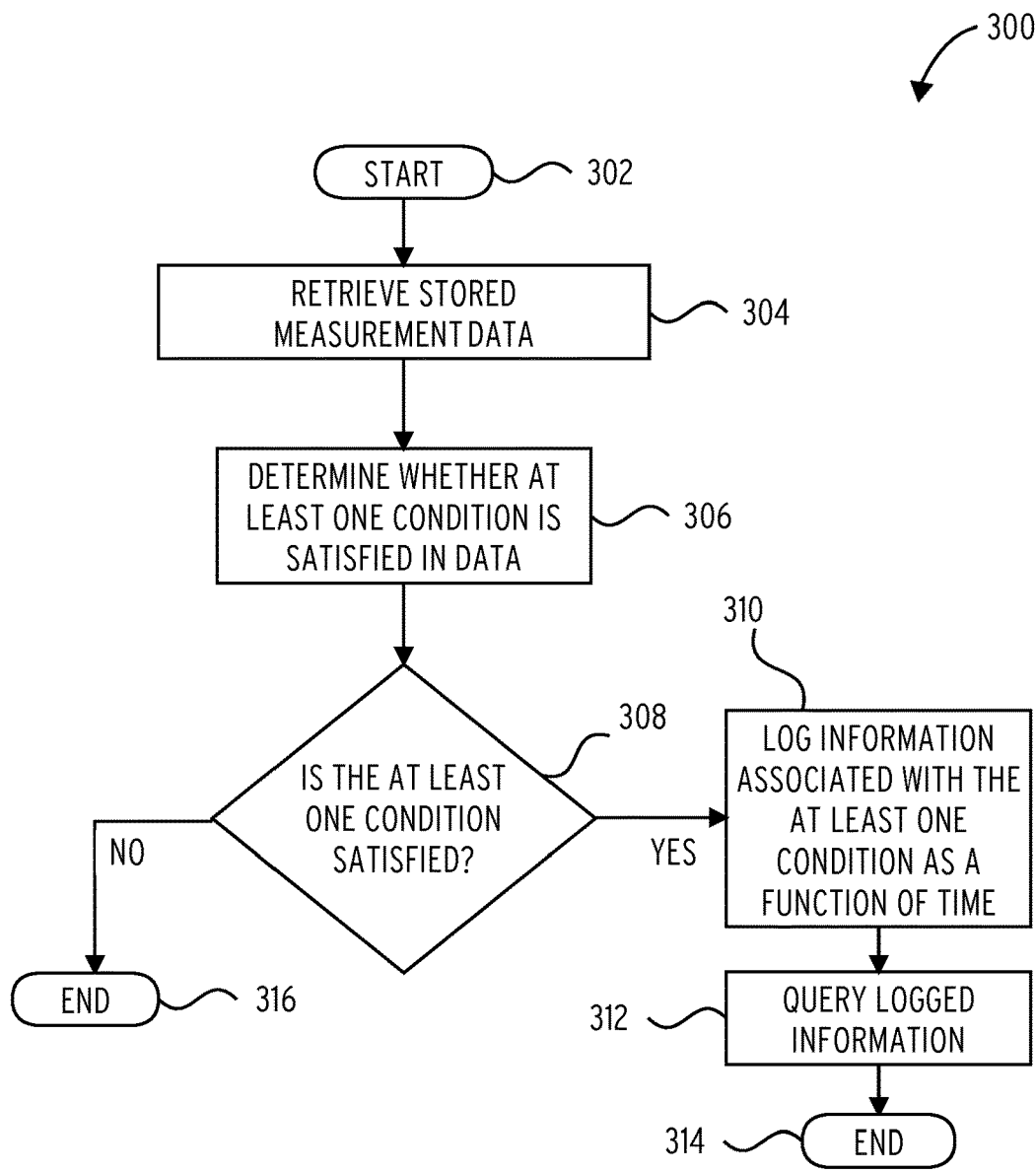
FIG. 3 depicts a flow chart of a method, according to an embodiment.

FIG. 3 depicts a flow chart of a method 300, according to an exemplary embodiment. Method 300 begins at block 302 and includes retrieving measurement data that is already stored and aligned against time (block 304). These measurement data can be stored in one or more files and/or across one or more databases. The measurement data can be obtained previously from one or more sensors, as described above with respect to method 200.

A controller executing method 300 can be programmed to determine whether specific conditions exist in the retrieved data (block 306). For example, determining whether a specific condition exist can include determining whether a turbine's instantaneous speed or average speed had fallen below a predetermined threshold, or whether it was in a given range, or whether it had exceed a predetermined threshold during the time period in which the data were acquired. Another condition may be, for example, the rate of change of a variable having exceeded a predetermined threshold or being within a range.

Method 300 can further include checking whether one or more conditions are met, depending on a specified query, i.e. depending on a specified database access command (decision block 308). For example, a specified query can include checking two conditions, or in some cases, it can include checking just one condition.

If the at least one condition is not satisfied, method 300 ends at block 316. Otherwise, method 300 includes logging information associated with the at least one condition as a function of time. Specifically, when method 300 finds that the condition is satisfied, markers identifying the specific condition that is met as well as the time index of the logged data at which it is met can be saved in a generated information file (block 310). For example, if the rate of change of speed is found to exceed a predetermined threshold, the times at which this occurs are saved.

As such, in the future, information can be queried simply from the logged information file to identify times or time slices when specific conditions are met (block 312). Method 300 ends at block 314.

Similarly to method 200, a controller executing method 300 can be supplied a set of rules against which the retrieved data can be checked. The rules can embody any condition that a user wishes to check. Furthermore, and similarly to method 200, once information has been logged with respect to time indices at which the conditions are met, additional queries can be performed or rules can be applied on the logged data to determine when they satisfy additional conditions.

Figure 4:
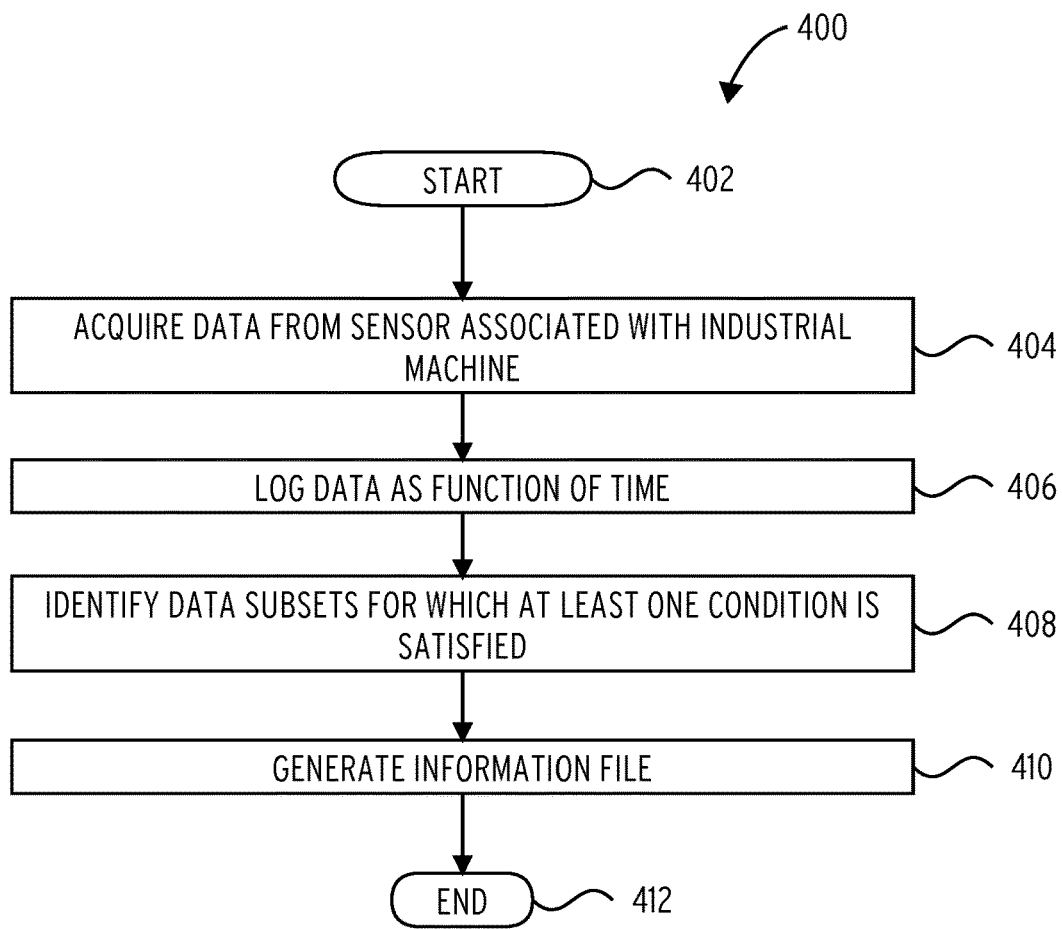
FIG. 4 depicts a flow chart of a method, according to another embodiment.

FIG. 4 depicts a flow chart of a method 400, according to another embodiment. Method 400 begins at block 402 and includes acquiring data from at least one sensor associated with one or more industrial machines (block 404). Method 400 further includes logging the acquired data as a function of time (block 406). This can be performed by generating a first file and saving the data as a function of time in the first file.

At block 408, method 400 includes parsing through the logged data set to identify times or time slices for which at least one condition is satisfied. As in the case of method 200, these conditions may be supplied to a controller executing method 400 in the form of a rules set or as a query. At block 410, method 400 includes identifying subsets of data for which the at least one condition is satisfied. This may be achieved by generating a second file (i.e. a trend information file) where time indices and/or subsets of data satisfying the at least one condition are saved (block 410). Method 400 ends at block 412.

Method 400 is similar to method 200 in that it also generates an information file that can later be queried to save time. However, method 400 requires parsing through the whole data set at least once to identify the times and time slices at which the data satisfy a specified condition.

In contrast, in method 200, the whole data set is never parsed in its entirety since conditions are checked during measurement and acquisition. However, this may slow down the speed of acquisition in some applications. Contrary to method 200, method 400 does not impede fast acquisition, but the trade-off is that the data set is parsed at least once to generate the information file.

Method 400 can further include querying a database including the logged data to identify data subsets for which at least one condition is satisfied. Generally, method 400 can further include identifying a time slice for which at least one condition is satisfied. Furthermore, method 400 can include generating a forecast based on at least one data subset corresponding to the time information included in the database. The forecast can include a predicted performance trend of the industrial machine for a future time period.

Figure 5:
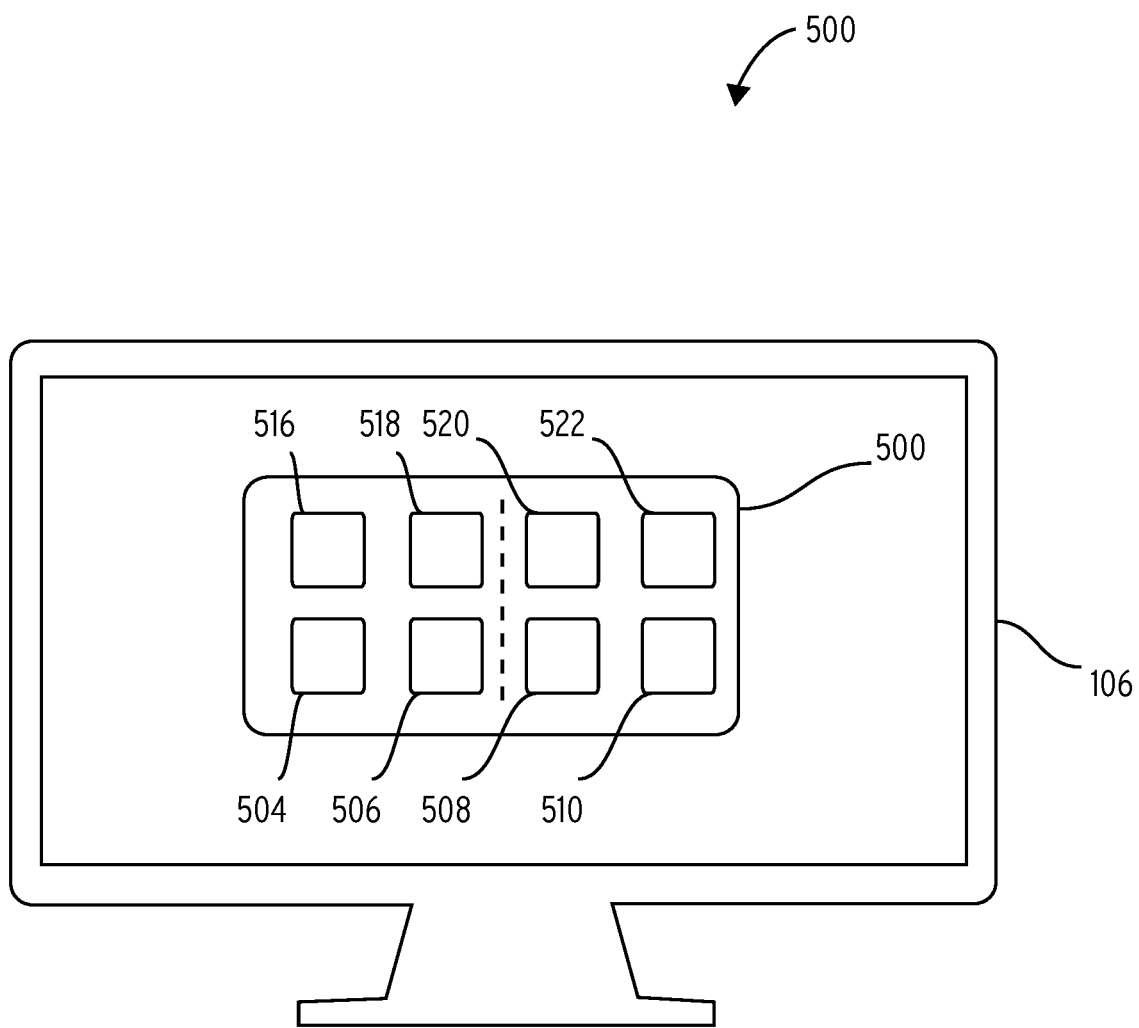
FIG. 5 is an illustration of a user interface, according to an embodiment.

FIG. 5 is an illustration of a user interface (UI) 500, according to an embodiment. UI 500 can be part of a greater Human/Machine Interface (HMI) that is designed to provide control and monitoring capabilities to a user of computer 106, for example. In one section, UI 500 can feature a plurality of applications (504, 506, 516, and 518) where each application is associated with a specific query or rule set for checking a specific condition. A second section of UI 500 (delimited from the first section by a dashed line) can include a plurality of indicators (508, 510, 520, and 522), wherein each indicator is associated with a specific industrial machine.

As such, a user can simply select one or more applications and one or more indicators to cause method 200, method 300, or method 400 to be executed in association with the industrial machines corresponding to the selected indicators and using rules defined by the applications selected.

A natural programming or scripting language can be used at the back-end of UI 500 to access the data reported by the sensors' of the industrial machines and to execute the customized queries. UI 500 can further include a set of pre-configured graphical tools with which trends can be displayed. The trends can be the subsets of the measured data for which the data satisfy at least one condition in the selected queries.

In some embodiments a query can be achieved using commands based on pseudo-natural language inputted via a terminal's command line prompt. In other embodiments, queries can include pseudo-natural language commands executed via a visual interface, such as a graphical user interface (GUI). Furthermore, pseudo-natural language based queries can come from already existing and/or commercially available tools. Moreover, outputs/results of executing the exemplary methods can be shown through a graph or a visual object, either one of which can include additional handles for optionally outputting trend forecasts or statistical analyses.

Moreover, the exemplary methods can align the data extracted by a query (speed values, for example) along a time axis, even when the data may be from different days, machines, and/or plants. Furthermore, the exemplary methods described above can include producing statistical measures based on one or more result obtained from a specified query for one trend or for multiple similar trends.

In yet other embodiments, a query can have an SQL-like structure that can be pre-loaded based on the rules and conditions of specific parsing methods, which may be customized for different applications. For example, a query for a gas turbine can be "SELECT "NGG" FROM "LM2500 & DLE" WHERE CONDITION IS "IDLE & !EOS" WITH "NGG<9000" FOR "LAST 100."

Generally speaking, a natural language or a pseudo-natural language query is one that includes keywords that may be found in spoken English (or any other spoken language), e.g. "TIME", "FIND", "SELECT", "WITH", "CONDITIONS." The keywords are engineered to produce a specific command when applied to a database or structured data source. In the embodiments, a rule that is used to parse the data to extract desired trend information can be part of a custom language that is defined for the specific application at hand.

As such, considering the example query above, "NGG" can be a term representing the speed of the high-power turbine in an LM2500 gas turbine of the DLE family. A rule can include the definition of LM2500 (a qualifier on the acquired trend data), and a trend line associated with the variable called "NGG" can be saved. The term "IDLE" is a specific condition well-known in the oil and gas industry, representing an NGG speed of about 6800 revolutions per minute (rpm) approximately. As such, a rule can be configured to cause the parsing of a data file or an information file for extracting the NGG trend data and for identifying whether the "IDLE" condition has been met. The term "EOS" can be an "end of sequence" tag configured to mark the end of a data sequence during parsing. Furthermore, the terms "LAST 100" can indicate a specific data subset that is to be analyzed, e.g. for the last 100 days or hours.

Although the example above is related to applications in the oil and gas industry, other fields are contemplated, and the same methods and hardware disclosed herein are also applicable. For example, in the appliances industry, the methods may be executed by a controller configured to monitor trend data from a dishwasher. In this example, a rule can have qualifiers for the dishwasher's basket size. In addition, the rule can include tags for acquiring measurements of the rotational speed, the type of control program used, and/or vibrations, humidity, temperature, and/or water levels. The rules and tags in such an application are syntactically different from the rules and tags described above for the case of a gas turbine, but the querying structure can be the same.

Figure 6:
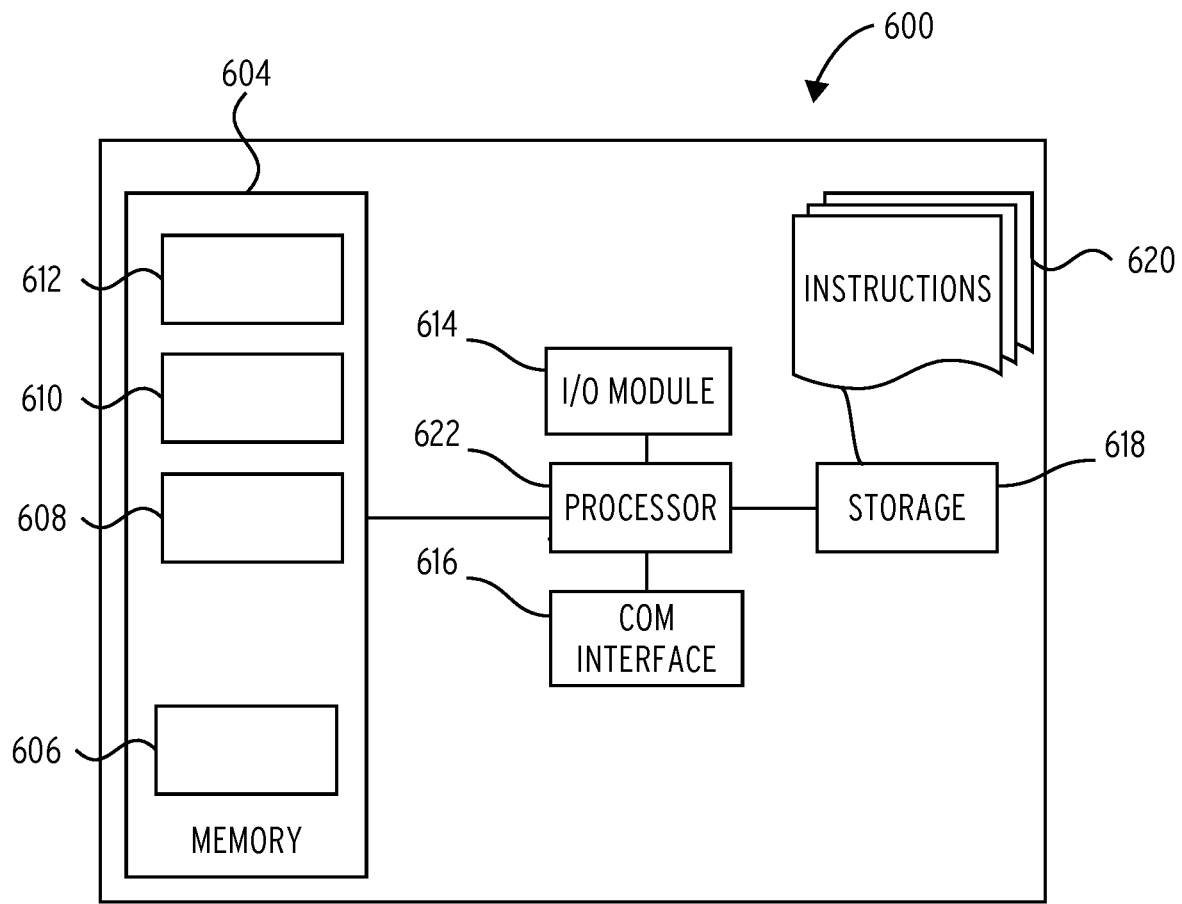
FIG. 6 is a block diagram of a device, according to an embodiment.

Having set forth various exemplary embodiments of the invention, a controller 600 (or system) capable of executing methods consistent with the teachings of the present disclosure is now discussed with respect to FIG. 6.

FIG. 6 is a block diagram of controller 600 including a processor 622 having a specific structure. Controller 600 is a smart trender that can be programmed to execute fast trending analysis, as embodied in the exemplary methods discussed above.

The specific structure is imparted to processor 622 by instructions stored in a memory 604 included therein and/or by instructions 620 which can be fetched from a storage medium 618. The storage medium 618 may be co-located with controller 600 as shown, or it may be located elsewhere and be communicatively coupled to controller 600. In other embodiments, storage medium 618 can be a non-transitory computer-readable medium including instructions 620.

Controller 600 can be a stand-alone programmable system, or it can be a programmable module located in a much larger system, like a DCS, for example. Alternatively, controller 600 can be part of an industrial machine controller. Controller 600 may include one or more hardware and/or software components configured to fetch, decode, execute, store, analyze, distribute, evaluate, and/or categorize information. One such component can be an input/output hardware (I/O module 614) configured to provide a user interface and/or to couple to one or more sensors of one or more industrial machines.

Processor 622 may include one or more processing devices or cores (not shown). In some embodiments, processor 622 may include a plurality of processors, each having either one or more cores. Processor 622 can be configured to execute instructions fetched from memory 604, i.e. from at least one of memory block 612, memory block 610, memory block 608, and memory block 606, or the instructions may be fetched from storage medium 618, or from a remote device connected to controller 600 via communication interface 616.

Furthermore, without loss of generality, storage medium 618 and/or memory 604 may include a volatile or non-volatile, magnetic, semiconductor, tape, optical, removable, non-removable, read-only, random-access, or any type of non-transitory computer-readable computer medium. Storage medium 618 and/or memory 604 may include programs and/or other information that may be used by processor 622. Storage medium 618 may be configured to log data processed, recorded, or collected during the operation of controller 600. The data may be time-stamped, location-stamped, cataloged, indexed, or organized in a variety of ways consistent with data storage practice.

In some embodiments, for example, memory block 608 include instructions that, when executed by processor 612, cause processor 622 to perform certain operations. The operations can include receiving data from the one or more sensors. The operations can further include determining whether at least one condition is satisfied in the data. Further, the operations can include generating data files and information files, as discussed previously. The operations can also include logging the data as a function of time. Furthermore, the operations can include logging information associated with the at least one condition as a function of time, in response to the at least one condition being satisfied. The operations can also include querying the logged information, subsequent to logging the data, to identify subsets of the data for which the at least one condition is satisfied.

The operations can further include forecasting, based on at least one subset of the data, a trend of a specific industrial machine over a future period of time. For example, forecasting can be achieved by extrapolating the trend obtained from the query. Moreover, in some embodiments, a query may yield subsets of the data for which the at least one condition and at least one other condition are satisfied.

Those skilled in the relevant art(s) will appreciate that various adaptations and modifications of the embodiments described above can be configured without departing from the scope and spirit of the disclosure. Therefore, it is to be understood that, within the scope of the appended claims, the disclosure may be practiced other than as specifically described herein.

What is claimed is:

1. A method for use by a system coupled to at least one of a gas turbine and a combustor, the method comprising:
   acquiring data from a sensor associated with one of the gas turbine and the combustor;
   while acquiring data, determining whether a first condition is satisfied in the data;
   if the first condition is not satisfied,
      logging, in a first data file, the data as a function of time;
   if the first condition is satisfied,
      logging, in a second data file, the data as a function of time and information associated with the first condition, the information including a marker identifying the first condition and a time index;
   after logging the data in the second data file, querying the second data file for the marker or the time index to identify a subset of the data, the subset of the data reflecting a second condition that is satisfied and logging the subset of the data in a third data file, wherein the second condition is different from the first condition; and
   forecasting, based on the subset of the data, a predicted performance trend of one of the gas turbine and the combustor for a future time period.

2. The method of claim 1, wherein the querying includes comparing the logged information with the logged data.

3. The method of claim 1, further comprising:
   identifying the subset of the data by identifying time indices in the logged data that match with time indices of the logged information.

4. The method of claim 1, further comprising:
   after logging the data, determining time periods for which the first condition is satisfied.

5. The method of claim 1, further comprising:
   after logging the data, determining time periods for which the first condition and the second condition are satisfied.

6. The method of claim 1, further comprising:
   comparing the subset of the data with a corresponding subset of data associated with an industrial machine other than the gas turbine or the combustor.

7. A non-transitory computer-readable medium for use with a system coupled to at least one of a gas turbine and a combustor, the non-transitory computer-readable medium comprising instructions, which when executed by a processor, cause the processor to perform operations comprising:
   acquiring data from a sensor associated with one of the gas turbine and the combustor;
   while acquiring data, determining whether a first condition is satisfied in the data;
   if the first condition is not satisfied,
      logging, in a first data file, the data as a function of time;
   if the at least one condition is satisfied,
      logging, in a second data file, the data as a function of time and information associated with the first condition, the information including a marker identifying the first condition and a time index;
   after logging the data in the second data file, querying the second data file for the marker or the time index to identify data a subset of the data, the subset of the data reflecting a second condition that is satisfied and logging the subset of the data in a third data file, wherein the second condition is different from the first condition;
   and
   forecasting, based on the subset of the data, a predicted performance trend of one of the gas turbine and the combustor for a future time period.

8. The non-transitory computer-readable medium of claim 7, wherein the operations further include determining, by querying the second data file and the third data file, a time slice for which the first condition or the second condition is satisfied.

9. A controller for use in a system coupled to at least one of a gas turbine and a combustor, the controller comprising:
   a processor;
   a memory including instructions that, when executed by the processor, cause the processor to perform operations comprising:
      receiving data from a sensor associated with one of the gas turbine and the combustor;
      while receiving data, determining whether a first condition is satisfied in the data;
      if the first condition is not satisfied,
         logging the data as a function of time;
      if the at least one condition is satisfied,
         logging, in a first data file, the data as a function of time and information associated with the first condition, the information including a marker identifying the first condition and a time index;
      after logging the data tin the second data file, querying the second data file for the marker or the time index to identify a subset of the data, the subset reflecting a second condition that is satisfied and logging the subset of data in a third data file, wherein the second condition is different from the first condition; and
      forecasting, based on the subset of the data, a predicted performance trend of one of the gas turbine and the combustor for a future time period.

10. The controller of claim 9, wherein the operations further include, based on the querying the second data file and the third data file, determining time slices for which the first condition and the second condition is satisfied.

11. The method of claim 1, wherein the querying is based on one of: (i) a first pseudo-natural language command inputted via a command prompt, (ii) a second pseudo-natural language command inputted through a visual interface, and (iii) a third pseudo-natural language command inputted via an external tool communicatively coupled to the system.

12. The non-transitory computer-readable medium of claim 7, wherein the querying is based on one of: (i) a first pseudo-natural language command inputted via a command prompt, (ii) a second pseudo-natural language command inputted through a visual interface, and (iii) a third pseudo-natural language command inputted via an external tool communicatively coupled to the system.

13. The controller of claim 9, wherein the querying is based on one of: (i) a first pseudo-natural language command inputted via a command prompt, (ii) a second pseudo-natural language command inputted through a visual interface, and (iii) a third pseudo-natural language command inputted via an external tool communicatively coupled to the system.

14. The method of claim 1, wherein the querying includes multiple queries that are concatenated to form a single database access command configured to fetch or discriminate a plurality of conditions from the data.

15. The method of claim 1, wherein the forecasting comprises extrapolating the predicted performance trend.

* * * * *